_United States Patent_ [19]

Horgan

[11] 3,897,569

[45] July 29, 1975

[54] MALTING

[75] Inventor: Ronald Horgan, Eaglemont, Australia

[73] Assignee: Barrett Bros. & Burston & Company Proprietary Limited, Australia

[22] Filed: July 30, 1973

[21] Appl. No.: 383,729

[52] U.S. Cl. ................................................ 426/28
[51] Int. Cl.$^2$ ........................................ A23L 1/185
[58] Field of Search ............ 195/69, 70, 71; 426/28, 426/64

[56] References Cited
UNITED STATES PATENTS
3,385,763  5/1968  Bloch.................................. 195/70

_Primary Examiner_—A. Louis Monacell
_Assistant Examiner_—R. B. Penland
_Attorney, Agent, or Firm_—Shlesinger, Fitzsimmons & Shlesinger

[57] ABSTRACT

An improved malting process comprises the steps of steeping barley or other cereal grain to initiate germination thereof, subjecting the germinated grain to a treatment to restrict further growth and respiration of the grain, and malting the grain in a relatively short period. The treatment may be a mechanical treatment such as pumping the grain in water, or it may be a temperature or chemical treatment. The subsequent malting may be carried out at a temperature between 20° and 40°C and the malting period is less than 48 hours.

5 Claims, No Drawings

MALTING

BACKGROUND OF INVENTION

This invention relates to improvements in malting and relates particularly to an improved process for producing a malt from grain, such as barley, wheat, corn or the like.

The traditional or classic malting process generally comprises steeping the grain to be malted for a period of time to initiate germination, removing the steep water and allowing the germinating grain to malt in a germinating box, tower or drum whilst maintaining the temperature of the grain at between about 15° and 20°C., and, when the grain is sufficiently malted, kiln-drying the resultant malt product. Such process normally takes about 6 days to complete although the addition of various plant hormones and chemicals, such as gibberellic acid and potassium bromate may slightly decrease the time necessary to complete the process.

Naturally, different grains and grain varieties produce malt of different characteristics. Barley malt is the most common malt, being used in the production of beer, and the desired characteristics therefor are often difficult to obtain without a relatively lengthy malting period.

It is generally well accepted that in the malting process, grain germination releases enzymes within the grain and that it is these enzymes which cause the malting to occur. It is believed that a plant hormone produced by the germinating embryo travels through the outer layer of the grain and releases the enzymes which then attack the grain.

SUMMARY OF THE INVENTION

It is an object of the present invention to provide an improved process for malting grain whereby the total malting time, that is the time from commencement of the steeping to the end of the germinating period, is substantially reduced without compromising the character or quality of the resulting malt.

It is a further object of the invention to improve the malt yield by decreasing respiration and growth losses.

A still further object of the invention is to provide an improved malting process which requires a minimum of alteration or modification of existing malting plant presently in use.

The invention generally comprises a malting process which includes the step of applying a pressure pulse or shock to the grain after initial grain germination such that subsequent malting results in a malt within a period of about 48 hours from the time of applying the pressure pulse or shock which, on kiln-drying, has a fine-coarse extract difference of not more than about 3 per cent.

It is believed that after initial germination, sufficient enzyme production has occurred in the grain to enable the malting process to continue, and the application of pressure of pressure pulses damages or otherwise affects the embryo to restrict further growth of the vegetative parts of the grain.

It has been found that a pressure application at a time before initial germination inhibits the malting process. Therefore, it is important that germination has proceeded to a point where the malting process will continue before applying the pressure pulse or shock.

The pressure application may comprise simply a sudden pressure increase or it may consist of a pressure reduction followed by a pressure increase.

In one preferred method of malting according to the invention, barley grain is steeped, by any conventional method, to initiate grain germination. The steeped grain is then immersed in water and pumped from the steeping vessel to a germinating vessel, such as a germination tower, kiln or box where it remains for a period of up to about 48 hours to complete the malting process.

The transference of the germinating grain from the steeping vessel to the germinating vessel by pumping applies pressure pulses to the grain to thereby restrict further growth and respiration of the grain. The pumping pressure may be between about 5 and 40 pounds per square inch measured at the pump outlet.

A further preferred feature of this invention to further improve the malting process is to elevate the temperature of the grain at least after the pressure application or pumping thereof so that at least the final malting stage is carried out at a temperature above about 20°C and preferably between 20° and 38°C. Moisture build-up on the grain is reduced by maintaining a flow of air through the grain by means of fans or blowers.

It has been found that a malt having a fine-coarse extract difference of less than 3 percent may be obtained in a time as little as about 12 hours or even less after the pumping stage by maintaining the grain in the final germination vessel at a temperature of 25° to 35°C.

The increase in temperature at which the malting process, according to this aspect of the invention, takes place may commence during steeping and may continue during any re-steeping, first and second germinating stages, depending on the malting process adopted. However, it is necessary that at least the germination stage following the pressure treatment is carried out at the elevated temperature to realise the advantages thereof.

Further, as the germinating grain develops heat at the rate of between about 2 and 6 Btu's/lb/hr. it is often necessary to provide refrigeration to maintain the normally desired malting temperatures. With the present invention, however, the need for such refrigeration is much reduced and may be even eliminated as the heat developed by the grain may be utilized to maintain its elevated temperature, any excess heat being simply removed by the air flow maintained through the grain.

DETAILED DESCRIPTION

The invention will be described with reference to the following examples.

EXAMPLE 1

Barley grain was submitted to a malting process which consisted of steeping the grain in water at about 15°C for 1 hour, draining the water and providing an air-rest for 22 hours followed by a further 1 hour immersion in water at about 15°C after which the water was drained and gibberellic acid was added to the grain. This was followed by a further 22 hours air rest. The grain was then subjected to a further brief immersion followed by a pressure treatment which comprised pumping the grain in the water from the steep tower to a germination tower. The pump pressure measured at the pump outlet was between 15 and 20 pounds per square inch. The grain in the germination tower was drained of water and maintained at a temperature of about 20°C for 24 hours to complete the malting process.

EXAMPLE 2

For comparative purposes the general procedure of Example 1 was followed except that the grain, after steeping, was not subjected to any pumping or other pressure treatment.

The results obtained from both examples 1 and 2 are set out below in Table 1.

TABLE 1

| Example | I.B. Extract | Malting loss |
|---------|--------------|--------------|
| 1 | 90 Brewer's lb. per 320 lb. quarter | 3% |
| 2 | 83 Brewer's lb. per 320 lb. quarter | 5% |

Examination of the malt produced by example 1 showed that a malt was produced which was equivalent to a normal malting process of 5 to 6 days, but that the malting losses were lower than would normally be expected.

EXAMPLE 3

Australian barley grain of Dampier variety was steeped in water at about 27°C for about 10 hours, the water being drained after 3 hours, followed by an air rest period. During the immersion period air was passed through the grain to remove $CO_2$ and provide $O_2$ saturation, whilst simultaneously agitating the grain.

The grain was then conveyed to a germinating steep, where gibberellic acid (0.3 ppm) and potassium bromate (150 ppm) was percolated through the grain for 3 hours. The grain mass was cooled to about 25°C by a continuous air flow. After the initial cooling, the heat of respiration of the germinating grain increased from about 0.7Btu/lb/hr to about 4Btu/lb/hr. During this time — approximately 24 hours — the grain mass increased in temperature so that at the end of the air rest period the temperature of the air on was about 27°C and air off was about 35°C.

The grain was then tipped dry from this initial germinating stage into a minimum volume of water, entrained and pumped to a germination kiln. The pumping pressure was about 20 pounds per square inch.

At the time of pumping it was noticed that the acrospire development was about quarter to half the length of the grain.

The temperature of the grain in the germination kiln was elevated to about 27°C by continuous warm air circulation. After 14 hours, a sample was taken and kiln dried. It showed the following analysis:

| | |
|---|---|
| E.B.C. Fine dry extract | 81.1% |
| Soluble nitrogen | 0.680% |
| Fine-coarse extract difference | 2.1% |
| Total nitrogen | 1.62% |

Malting loss was less than 4 percent.

EXAMPLE 4

The procedure of example 3 was followed except that the grain was sampled after 28 hours in the germination kiln. This sample returned the following analysis:

| | |
|---|---|
| E.B.C Fine dry extract | 80.6% |
| Soluble nitrogen | .780% |
| Fine-coarse extract difference | 0.8% |
| Total nitrogen | 1.73% |

Malting loss was about 4.3 percent.

EXAMPLE 5

The procedure of example 3 was again followed except that the temperature of the grain in the germination kiln was maintained at about the normal malting temperature of between about 15° and 18°C.

At a period of 24 hours after the pumping stage, a sample, after kiln-drying, showed the following analysis:

| | |
|---|---|
| E.B.C. fine dry extract | 79.9% |
| Soluble nitrogen | 0.740% |
| Fine-coarse extract difference | 2.2% |
| Total nitrogen | 1.7% |

Malting loss was about 4.3 percent.

EXAMPLE 6

For comparative purposes, a further batch of grain was subjected to a similar process but in this case the grain was transferred to the germination kiln without pumping and the temperature of the malting grain in the kiln was maintained at about 15° to 18°C.

At a period of 28 hours after the time at which pumping would have taken place had the process been in accordance with the invention, a sample was taken and showed the following analysis:

| | |
|---|---|
| E.B.C fine dry extract | 74.6% |
| Soluble nitrogen | 0.480% |
| Fine-coarse extract difference | 6.4% |
| Total nitrogen | 1.65% |

The malt of this sample was very cloudy and very slow filtering.

In a modification of the malting process according to the invention, the growth and respiration of the grain is restricted by any means after initial germination and thereafter the grain is maintained at a temperature above about 20°C to accelerate the malting so as to produce, within a period not more than 48 hours from the time of restricting the growth and respiration of the germinated grain, a malt which, on kiln-drying has a fine-coarse extract difference of not more than 3 per cent.

In this modified process, the retardation or restriction of the growth and respiration of the germinating grain may be carried out by means such as the application of pressure as described above, by freezing and thawing, by hot water, by chemical means or by other mechanical means.

Once the growth and respiration of the germinated grain has been restricted, the temperature of the malting grain is elevated to between 20° and 40°C for the remainder of the malting time, which is not more than 48 hours and preferably about 24 hours.

Spoilage of the grain at the elevated temperature is prevented, or reduced to a minimum, by a substantial flow of air through the grain. The air flow is maintained by fans or blowers and prevents build up of moisture in the grain and acts to stop or reduce bacteriological action which causes spoilage. The malting of the grain, being accelerated by the high temperature, is carried through to the desired completion stage before spoilage can occur.

The following example illustrates the modification of causing restriction of growth and respiration of the grain followed by the high temperature treatment.

EXAMPLE 7

Australian barley grain of Dampier variety was steeped with water at about 27°C for about 10 hours, the water being drained after 3 hours, following by an air-rest period. During the immersion period air was passed through the grain to remove $CO_2$ and provide $O_2$ saturation, whilst simultaneously agitating the grain.

The grain was then conveyed to a germinating steep, where gibberellic acid (0.3ppm) and potassium bromate (150ppm) was percolated through the grain for 3 hours. The grain mass was cooled to about 25°C by a continuous air flow. After the initial cooling, the heat of respiration of the germinating grain increased from about 0.7Btu./lb/hr to about 4Btu/lb/hr. During this time — approximately 24 hours — the grain mass increased in temperature so that at the end of the air rest period the temperature of the air on was about 27°C and air off was about 35°C.

The grain was then slowly frozen over a period of 1 hour. After freezing the grain was returned to a germination kiln. At the time of freezing it was observed that the acrospire development was about one quarter to one half the length of the grain.

The temperature of the grain in the germination kiln was elevated to about 27°C by continuous warm air circulation after 20 hours a sample was taken and kiln dried. It showed the following analysis:

| | |
|---|---|
| E.B.C fine dry extract | 81.8% |
| Soluble nitrogen | 0.879% |
| Fine-coarse extract difference | 2.1% |
| Total nitrogen | 2.1% |
| The malting loss was | 5.4% |

The examples above clearly show that the process of the present invention substantially reduces malting time and malting losses whilst producing a malt of a quality comparable to that produced by traditional or classic malting processes. Further, it is envisaged that the improved malting process of the present invention will enable malting to be carried out in steep plant germination towers whereby the grain is fed to the top of one of a pair of towers, the grain being steeped in the first of the pair of towers before being preferably pumped to the second of the pair of towers. Such a plant arrangement would obviate the need to use germination boxes or germinating drums which are relatively expensive in construction, occupy a large amount of space and require the use of conveying means for conveying grain to the boxes or drums. Thus, the use of the present invention will enable significant reductions in the size and type of plant required for the malting process.

It will be appreciated that chemicals such as plant hormones or enzyme additions or the like may be added to the grain at any stage during the malting process, as is done during present known malting processes, to accelerate or improve the process.

It will also be appreciated that the process of the present invention may be used with any grain which may be malted and such grain may be treated as by abrading or the like, as is presently done in the art, in order to further assist the malting process.

It should be understood that, in the foregoing description and appended claims, where a fine-coarse extract difference is referred to this means a fine coarse extract difference according to the analytical methods of the European Brewing Convention (E.B.C.)

I claim:

1. A method of malting barley and other cereal grain comprising the steps of steeping the grain with water to initiate germination of the grain, continuing germination for a period of time to produce in the grain sufficient enzymes to complete the malting process, entraining the germinated grain in water and pumping it to a germination vessel by a pump which has an outlet pressure of at least 5 pounds per square inch, maintaining the grain in the germination vessel at a temperature of between 20° and 40°C for a period of not more than 48 hours while continuously aerating the grain, and thereafter drying the resulting malted grain.

2. A method according to claim 1 wherein the pumping pressure is between 5 and 40 pounds per square inch measured at the pump outlet.

3. A method according to claim 1 wherein the grain is maintained at a temperature of between about 25° and 35°C in said germination vessel.

4. A method according to claim 1 wherein minor amounts of gibberellic acid and potassium bromate are added to the grain before or during initial germination thereof.

5. A method according to claim 1 wherein the malted grain is removed from the germination vessel after a period of less than 36 hours after pumping, and the malt, after kiln-drying, has a fine-coarse extract difference of not more than 3 per cent.

* * * * *